(12) United States Patent
Cockram

(10) Patent No.: US 12,393,268 B2
(45) Date of Patent: Aug. 19, 2025

(54) GAZE TRACKING SYSTEM AND METHOD BASED ON A CONFIDENCE VALUE INDICATING AN EXPECTED RELIABILITY OF DETECTED PUPIL LOCATION

(71) Applicant: Sony Interactive Entertainment Inc., Tokyo (JP)

(72) Inventor: Philip Cockram, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/380,182

(22) Filed: Jul. 20, 2021

(65) Prior Publication Data
US 2022/0035449 A1    Feb. 3, 2022

(30) Foreign Application Priority Data
Jul. 28, 2020 (GB) .................................... 2011654

(51) Int. Cl.
| | | |
|---|---|---|
| *G06F 3/01* | (2006.01) | |
| *G02B 27/00* | (2006.01) | |
| *G02B 27/01* | (2006.01) | |
| *G06T 19/00* | (2011.01) | |
| *G06V 40/19* | (2022.01) | |

(52) U.S. Cl.
CPC ......... *G06F 3/013* (2013.01); *G02B 27/0093* (2013.01); *G02B 27/0101* (2013.01);
(Continued)

(58) Field of Classification Search
CPC .... G02B 2027/0138; G02B 2027/0187; G02B 27/0093; G02B 27/0101; G02B 27/017; G02B 27/0179; G02B 27/00; G02B 27/01; G02B 27/10; G06F 3/013; G06F 3/0304; G06F 3/01; G06F 3/02; G06F 3/14;
(Continued)

(56) References Cited

U.S. PATENT DOCUMENTS

| | | | |
|---|---|---|---|
| 10,537,244 B1* | 1/2020 | Barash ................ | A61B 3/113 |
| 2015/0199005 A1* | 7/2015 | Haddon ................ | G06F 3/013 |
| | | | 345/163 |

(Continued)

FOREIGN PATENT DOCUMENTS

| | | |
|---|---|---|
| EP | 3570145 A1 | 11/2019 |
| WO | 2020023672 A1 | 1/2020 |

OTHER PUBLICATIONS

Extended European Search Report for corresponding EP Application No. 21184215.8, 10 pages, dated Jan. 4, 2022.
(Continued)

*Primary Examiner* — Chanh D Nguyen
*Assistant Examiner* — Nguyen H Truong
(74) *Attorney, Agent, or Firm* — Fish & Richardson P.C.

(57) ABSTRACT

A gaze tracking system comprising a pupil detection unit operable to detect the location of a pupil in one or more images captured of one or both a user's eyes, a confidence value determination unit operable to determine a confidence value in dependence upon the identified pupil position, the confidence value indicating an expected reliability of the detection of the pupil location, and a processing unit operable to generate, in dependence upon the determined confidence value, one or more outputs to cause the user to modify their pupil location to a location with a higher determined confidence value.

16 Claims, 8 Drawing Sheets

(52) U.S. Cl.
CPC ....... *G02B 27/017* (2013.01); *G02B 27/0179* (2013.01); *G06T 19/006* (2013.01); *G06V 40/19* (2022.01); *G02B 2027/0138* (2013.01); *G02B 2027/0187* (2013.01)

(58) Field of Classification Search
CPC ........... G06T 19/006; G06T 3/44; G06T 5/50; G06T 7/00; G06T 7/70; G06T 7/73; G06T 19/00; G06V 40/19; G09G 5/00; G09G 5/10; G09G 5/36; G06K 9/00; G06K 9/32; H04N 5/33; H04N 5/225; H04N 5/345; H04N 21/25; H04N 21/44; H04N 21/218; H04N 21/258; H04N 21/442; H04N 21/4728; H04N 21/2343
See application file for complete search history.

(56) References Cited

U.S. PATENT DOCUMENTS

| | | | | |
|---|---|---|---|---|
| 2016/0004303 A1* | 1/2016 | Arar | .................. | G06F 3/013 345/156 |
| 2018/0210548 A1* | 7/2018 | Sato | .................. | G06F 3/013 |
| 2018/0314324 A1 | 11/2018 | Abed | | |
| 2020/0004331 A1 | 1/2020 | George-Svahn | | |
| 2020/0183490 A1* | 6/2020 | Klingström | ............. | G06F 3/013 |
| 2021/0174768 A1* | 6/2021 | Jarvenpaa | ............... | G06F 3/013 |
| 2022/0004256 A1* | 1/2022 | Sztuk | ................. | G02B 27/0189 |
| 2023/0245261 A1* | 8/2023 | Bastani | .................. | G06T 11/00 345/619 |

OTHER PUBLICATIONS

Thiago Santini, et al., "PuRe: Robust pupil detection for real-time pervasive eye tracking" Elsevier's Computer Vision and Image Understanding Journal, pp. 1-11, Dec. 24, 2017.
Combined Search and Examination Report for corresponding GB Application No. 2011654.7, 7 pages, dated Dec. 11, 2020.
Communication pursuant to 94.3 for corresponding EP Application No. 21184215.8, 5 pages dated Nov. 15, 2023.

* cited by examiner

LEFT          RIGHT

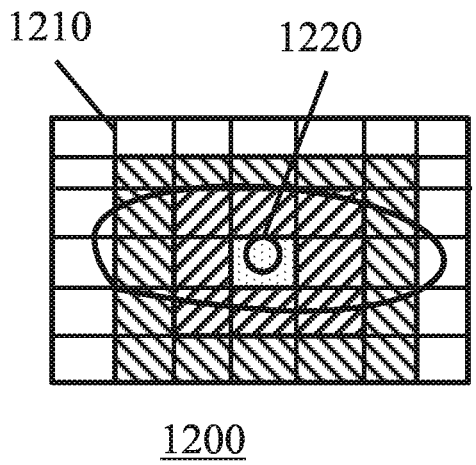 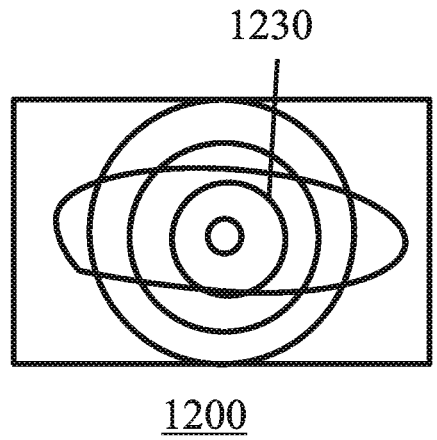
Figure 12A
Figure 12B
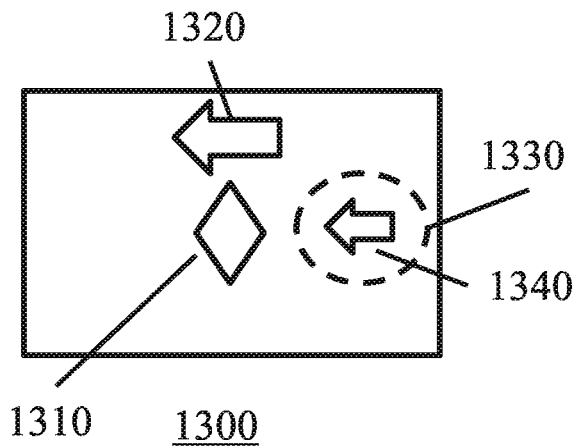 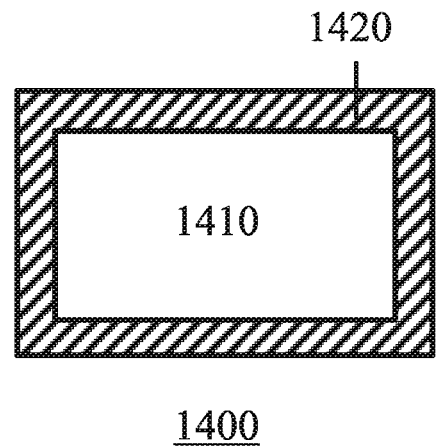
Figure 13
Figure 14

GAZE TRACKING SYSTEM AND METHOD BASED ON A CONFIDENCE VALUE INDICATING AN EXPECTED RELIABILITY OF DETECTED PUPIL LOCATION

BACKGROUND OF THE INVENTION

Field of the Invention

This disclosure relates to a gaze tracking system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Gaze tracking systems are used to identify a location of a subject's gaze within an environment; in many cases, this location may be a position on a display screen that is being viewed by the subject. In a number of existing arrangements, this is performed using one or more inwards-facing cameras directed towards the subject's eye (or eyes) in order to determine a direction in which the eyes are oriented at any given time. Having identified the orientation of the eye, a gaze direction can be determined and a focal region may be determined as the intersection of the gaze direction of each eye.

One application for which gaze tracking is considered of particular use is that of use in head-mountable display units (HMDs). The use in HMDs may be of particular benefit owing to the close proximity of inward-facing cameras to the user's eyes, allowing the tracking to be performed much more accurately and precisely than in arrangements in which it is not possibly to provide the cameras with such proximity.

By utilising gaze detection techniques, it may be possible to provide a more efficient and/or effective processing method for generating content or interacting with devices.

For example, gaze tracking may be used to provide user inputs or to assist with such inputs—a continued gaze at a location may act as a selection, or a gaze towards a particular object accompanied by another input (such as a button press) may be considered as a suitable input. This may be more effective as an input method in some embodiments, particularly in those in which a controller is not provided or when a user has limited mobility.

Foveal rendering is an example of a use for the results of a gaze tracking process in order to improve the efficiency of a content generation process. Foveal rendering is rendering that is performed so as to exploit the fact that human vision is only able to identify high detail in a narrow region (the fovea), with the ability to discern detail tailing off sharply outside of this region.

In such methods, a portion of the display is identified as being an area of focus in accordance with the user's gaze direction. This portion of the display is supplied with high-quality image content, while the remaining areas of the display are provided with lower-quality (and therefore less resource intensive to generate) image content. This can lead to a more efficient use of available processing resources without a noticeable degradation of image quality for the user.

It is therefore considered advantageous to be able to improve gaze tracking methods, and/or apply the results of such methods in an improved manner. It is in the context of such advantages that the present disclosure arises.

SUMMARY OF THE INVENTION

This disclosure is defined by claim 1.

Further respective aspects and features of the disclosure are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 12A and 12B schematically illustrate exemplary confidence value distributions;

FIG. 13 schematically illustrates a selection of UI elements in a display area;

FIG. 14 schematically illustrates a visual effect applied to the peripheral regions of a displayed image;

DESCRIPTION OF THE EMBODIMENTS

Figure 1:
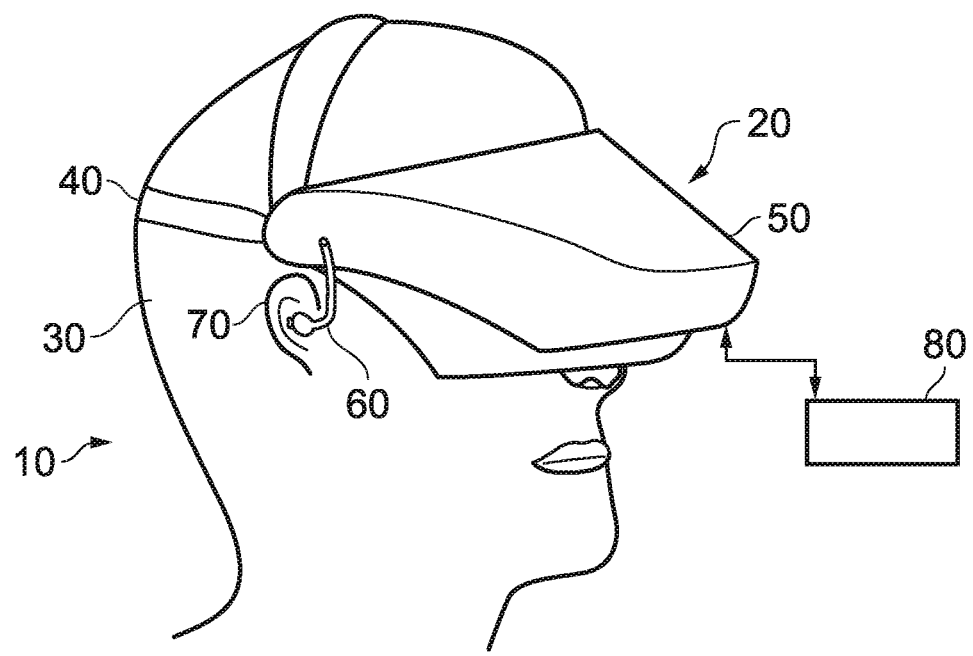
FIG. 1 schematically illustrates an HMD worn by a user.

Referring now to the drawings, wherein like reference numerals designate identical or corresponding parts throughout the several views, embodiments of the present disclosure are described. In FIG. 1, a user 10 is wearing an HMD 20 (as an example of a generic head-mountable apparatus—other examples including audio headphones or a head-mountable light source) on the user's head 30. The HMD comprises a frame 40, in this example formed of a rear strap and a top strap, and a display portion 50. As noted above, many gaze tracking arrangements may be considered particularly suitable for use in HMD systems; however, use with such an HMD system should not be considered essential.

Note that the HMD of FIG. 1 may comprise further features, to be described below in connection with other drawings, but which are not shown in FIG. 1 for clarity of this initial explanation.

The HMD of FIG. 1 completely (or at least substantially completely) obscures the user's view of the surrounding environment. All that the user can see is the pair of images displayed within the HMD, as supplied by an external processing device such as a games console in many embodiments. Of course, in some embodiments images may instead (or additionally) be generated by a processor or obtained from memory located at the HMD itself.

The HMD has associated headphone audio transducers or earpieces 60 which fit into the user's left and right ears 70. The earpieces 60 replay an audio signal provided from an external source, which may be the same as the video signal source which provides the video signal for display to the user's eyes.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera 122 may capture images to the front of the HMD, in use. Such images may be used for head tracking purposes, in some embodiments, while it may also be suitable for capturing images for an augmented reality (AR) style experience. A Bluetooth® antenna 124 may provide communication facilities or may simply be arranged as a directional antenna to allow a detection of the direction of a nearby Bluetooth transmitter.

In operation, a video signal is provided for display by the HMD. This could be provided by an external video signal source 80 such as a video games machine or data processing apparatus (such as a personal computer), in which case the signals could be transmitted to the HMD by a wired or a wireless connection. Examples of suitable wireless connections include Bluetooth® connections. Audio signals for the earpieces 60 can be carried by the same connection. Similarly, any control signals passed from the HMD to the video (audio) signal source may be carried by the same connection. Furthermore, a power supply (including one or more batteries and/or being connectable to a mains power outlet) may be linked by a cable to the HMD. Note that the power supply and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Some embodiments of the invention are applicable to an HMD having at least one electrical and/or optical cable linking the HMD to another device, such as a power supply and/or a video (and/or audio) signal source. So, embodiments of the invention can include, for example:

(a) an HMD having its own power supply (as part of the HMD arrangement) but a cabled connection to a video and/or audio signal source;

(b) an HMD having a cabled connection to a power supply and to a video and/or audio signal source, embodied as a single physical cable or more than one physical cable;

(c) an HMD having its own video and/or audio signal source (as part of the HMD arrangement) and a cabled connection to a power supply; or (d) an HMD having a wireless connection to a video and/or audio signal source and a cabled connection to a power supply.

If one or more cables are used, the physical position at which the cable enters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables relative to the HMD in FIG. 1 should be treated merely as a schematic representation.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the user's view of the external environment may not in fact be entirely obscured; the displayed images could be arranged so as to be superposed (from the user's point of view) over the external environment. An example of such an arrangement will be described below with reference to FIG. 4.

Figure 2:
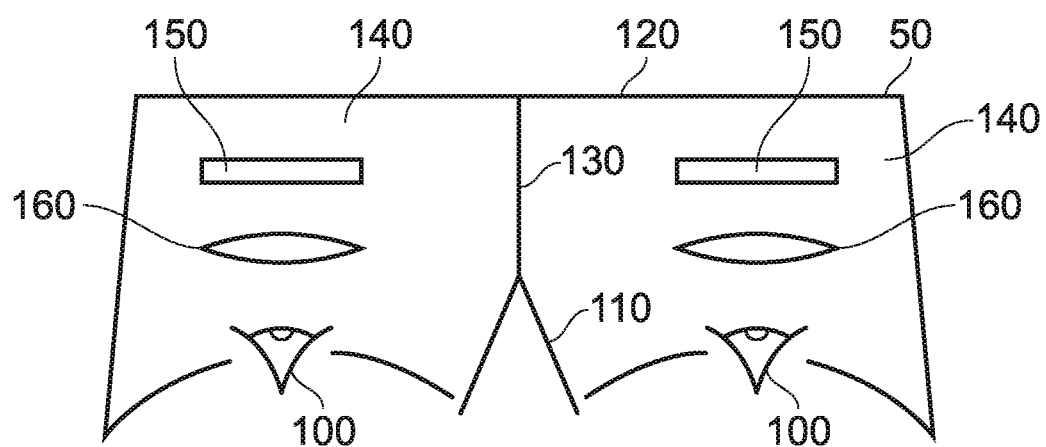
FIG. 2 is a schematic plan view of an HMD.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160.

The way in which the display element and the optical element(s) cooperate to provide a display to the user will be described with reference to FIG. 3.

Figure 3:
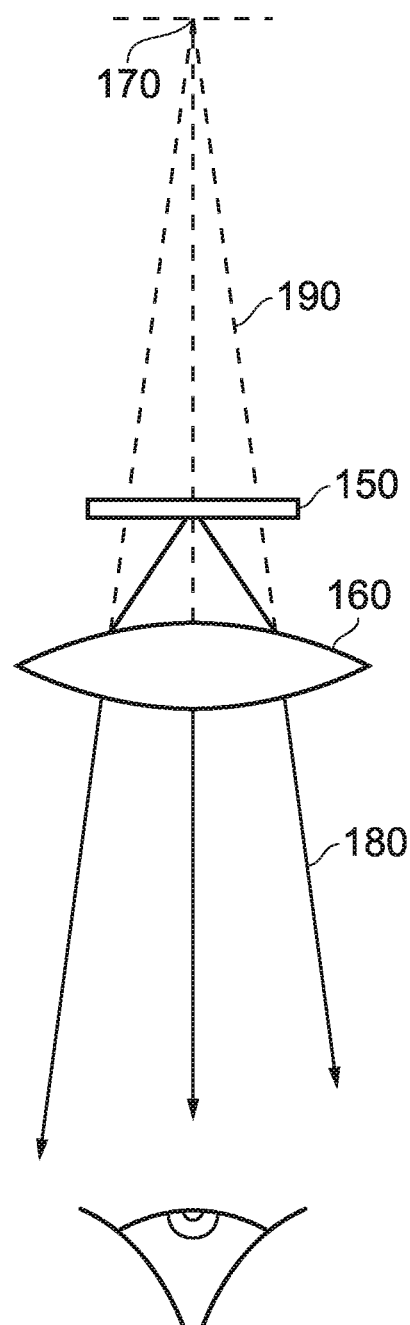
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several metres. In FIG. 3, solid lines (such as the line 180) are used to denote real optical rays, whereas broken lines (such as the line 190) are used to denote virtual rays.

Figure 4:
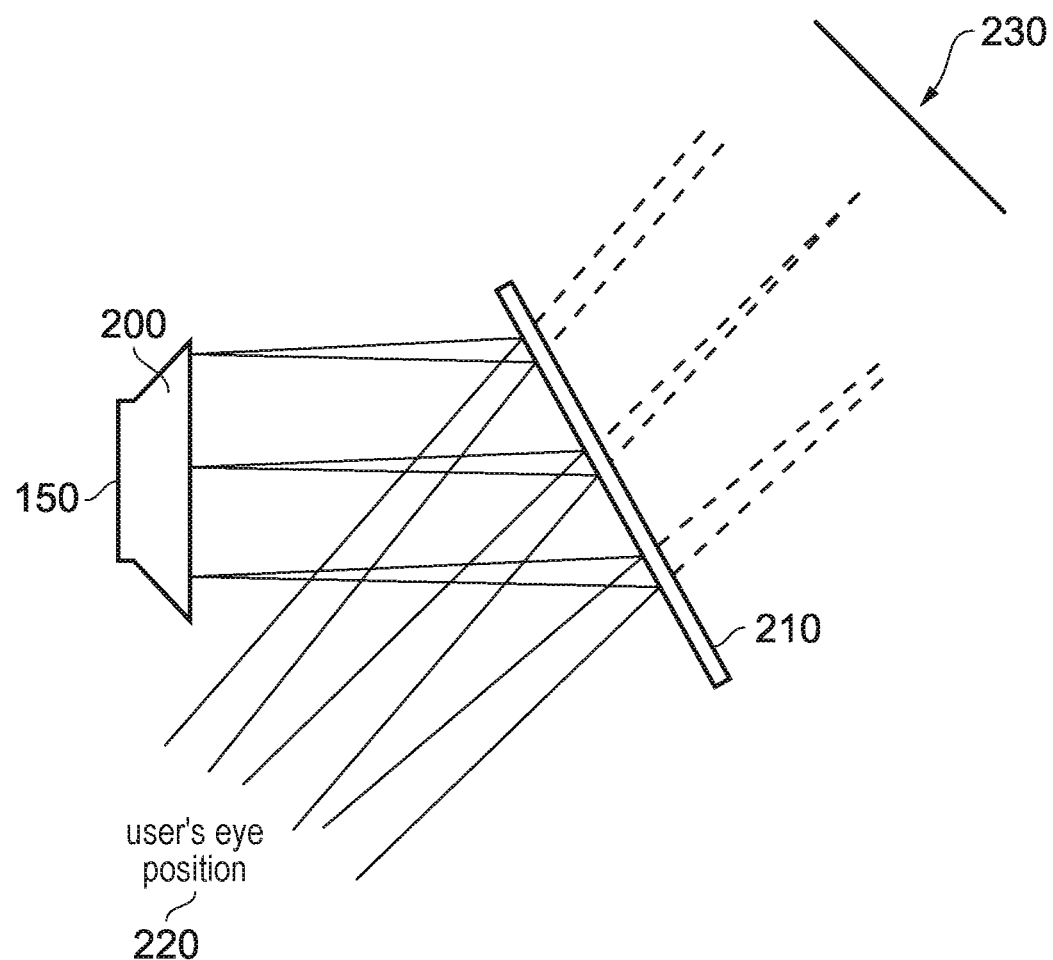
FIG. 4 schematically illustrates another type of display for use in an HMD.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint needs to track movements with respect to a real or virtual space in which the user is located.

As mentioned above, in some uses of the HMD, such as those associated with virtual reality (VR) or augmented reality (AR) systems, the user's viewpoint needs to track movements with respect to a real or virtual space in which the user is located.

This tracking is carried out by detecting motion of the HMD and varying the apparent viewpoint of the displayed images so that the apparent viewpoint tracks the motion. The detection may be performed using any suitable arrangement (or a combination of such arrangements). Examples include the use of hardware motion detectors (such as accelerometers or gyroscopes), external cameras operable to image the HMD, and outwards-facing cameras mounted onto the HMD.

Turning to gaze tracking in such an arrangement, FIG. 6 schematically illustrates two possible arrangements for performing eye tracking on an HMD. The cameras provided within such arrangements may be selected freely so as to be able to perform an effective eye-tracking method. In some existing arrangements, visible light cameras are used to capture images of a user's eyes. Alternatively, infra-red (IR) cameras are used so as to reduce interference either in the captured signals or with the user's vision should a corresponding light source be provided, or to improve performance in low-light conditions.

Figure 6A:
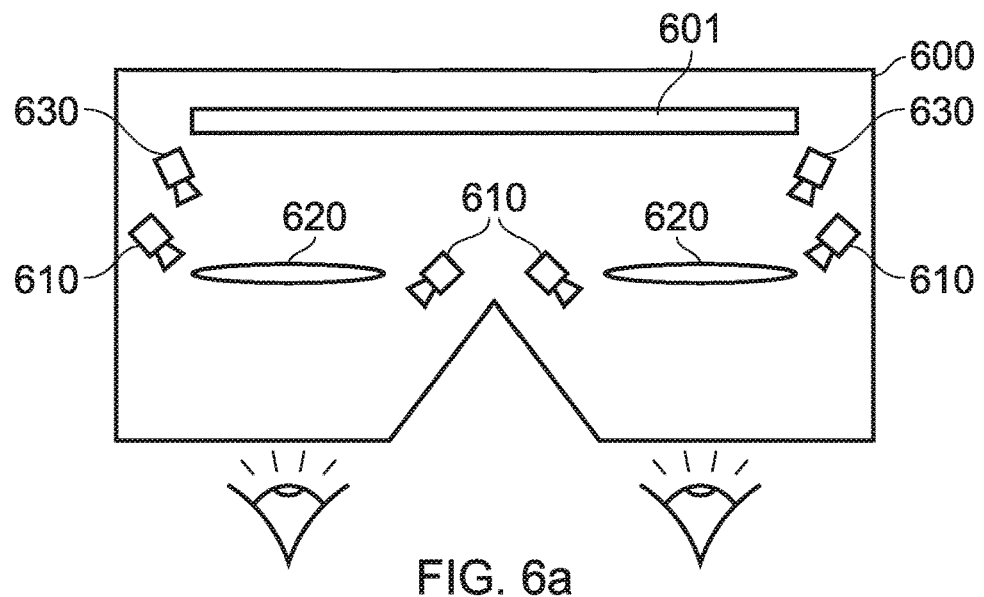
FIG. 6a schematically illustrates a plan view of an HMD.

FIG. 6a shows an example of a gaze tracking arrangement in which the cameras are arranged within an HMD so as to capture images of the user's eyes from a short distance. This may be referred to as near-eye tracking, or head-mounted tracking.

In this example, an HMD 600 (with a display element 601) is provided with cameras 610 that are each arranged so as to directly capture one or more images of a respective one of the user's eyes using an optical path that does not include the lens 620. This may be advantageous in that distortion in the captured image due to the optical effect of the lens is able to be avoided. Four cameras 610 are shown here as examples of possible positions that eye-tracking cameras may provided, although it should be considered that any number of cameras may be provided in any suitable location so as to be able to image the corresponding eye effectively. For example, only one camera may be provided per eye or more than two cameras may be provided for each eye.

However it is considered that in a number of embodiments it is advantageous that the cameras are instead arranged so as to include the lens 620 in the optical path used to capture images of the eye. Examples of such positions are shown by the cameras 630. While this may result in processing being required to enable suitably accurate tracking to be performed, due to the deformation in the captured image due to the lens, this may be performed relatively simply due to the fixed relative positions of the corresponding cameras and lenses. An advantage of including the lens within the optical path may be that of simplifying the physical constraints upon the design of an HMD, for example.

Figure 6B:
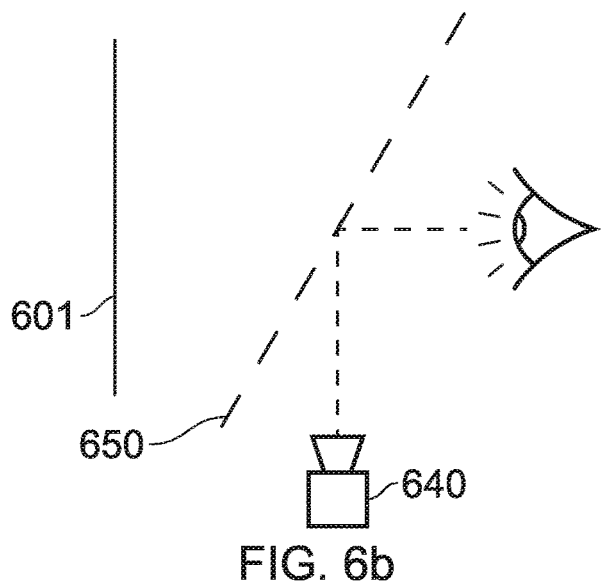
FIG. 6b schematically illustrates a near-eye tracking arrangement.

FIG. 6b shows an example of a gaze tracking arrangement in which the cameras are instead arranged so as to indirectly capture images of the user's eyes. Such an arrangement may be particularly suited to use with IR or otherwise non-visible light sources, as will be apparent from the below description.

FIG. 6b includes a mirror 650 arranged between a display 601 and the viewer's eye (of course, this can be extended to or duplicated at the user's other eye as appropriate). For the sake of clarity, any additional optics (such as lenses) are omitted in this Figure—it should be appreciated that they may be present at any suitable position within the depicted arrangement. The mirror 650 in such an arrangement is selected so as to be partially transmissive; that is, the mirror 650 should be selected so as to enable the camera 640 to obtain an image of the user's eye while the user views the display 601. One method of achieving this is to provide a mirror 650 that is reflective to IR wavelengths but transmissive to visible light—this enables IR light used for tracking to be reflected from the user's eye towards the camera 640 while the light emitted by the display 601 passes through the mirror uninterrupted.

Such an arrangement may be advantageous in that the cameras may be more easily arranged out of view of the user, for instance. Further to this, improvements to the accuracy of the eye tracking may be obtained due to the fact that the camera captures images from a position that is effectively (due to the reflection) along the axis between the user's eye and the display.

Figure 7:
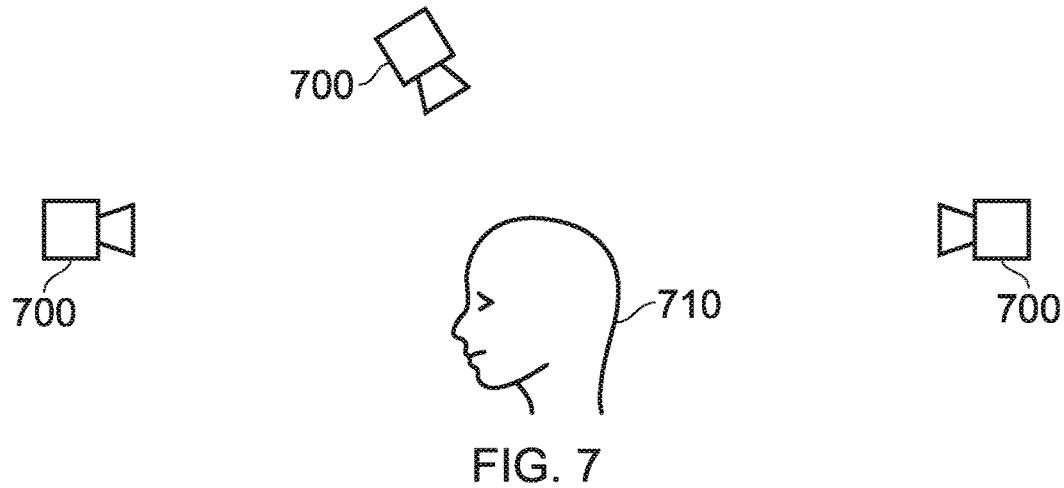
FIG. 7 schematically illustrates a remote tracking arrangement.

Of course, eye-tracking arrangements need not be implemented in a head-mounted or otherwise near-eye fashion as has been described above. For example, FIG. 7 schematically illustrates a system in which a camera is arranged to capture images of the user from a distance; this distance may vary during tracking, and may take any value in dependence upon the parameters of the tracking system. For example, this distance may be thirty centimetres, a metre, five metres, ten metres, or indeed any value so long as the tracking is not performed using an arrangement that is affixed to the user's head.

In FIG. 7, an array of cameras 700 is provided that together provide multiple views of the user 710. These cameras are configured to capture information identifying at least the direction in which a user's 710 eyes are focused, using any suitable method. For example, IR cameras may be utilised to identify reflections from the user's 710 eyes. An array of cameras 700 may be provided so as to provide multiple views of the user's 710 eyes at any given time, or may be provided so as to simply ensure that at any given time at least one camera 700 is able to view the user's 710 eyes. It is apparent that in some use cases it may not be necessary to provide such a high level of coverage and instead only one or two cameras 700 may be used to cover a smaller range of possible viewing directions of the user 710.

Of course, the technical difficulties associated with such a long-distance tracking method may be increased; higher resolution cameras may be required, as may stronger light sources for generating IR light, and further information (such as head orientation of the user) may need to be input to determine a focus of the user's gaze. The specifics of the arrangement may be determined in dependence upon a required level of robustness, accuracy, size, and/or cost, for example, or any other design consideration.

Despite technical challenges including those discussed above, such tracking methods may be considered beneficial in that they allow a greater range of interactions for a user—rather than being limited to HMD viewing, gaze tracking may be performed for a viewer of a television, for instance.

Rather than varying only in the location in which cameras are provided, eye-tracking arrangements may also differ in where the processing of the captured image data to determine tracking data is performed.

Figure 8:
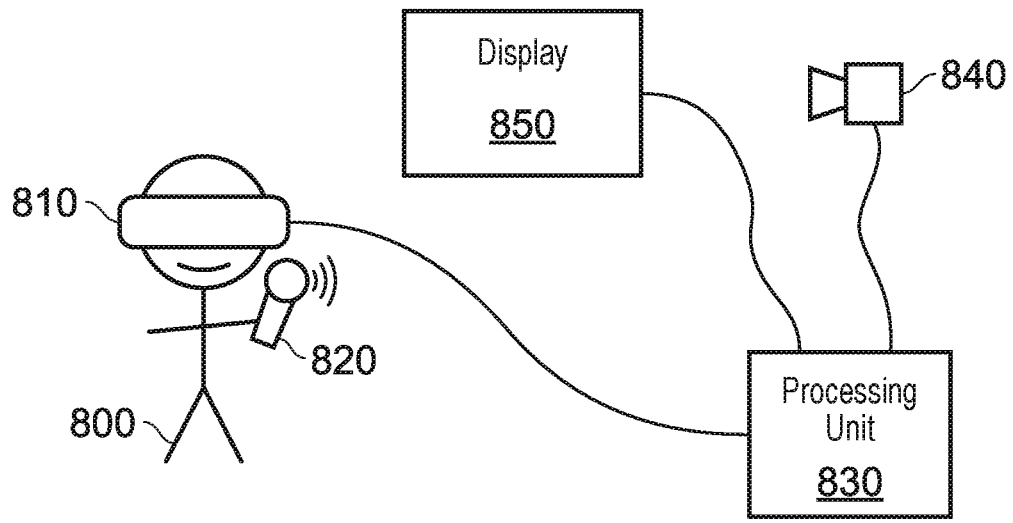
FIG. 8 schematically illustrates a gaze tracking environment.

FIG. 8 schematically illustrates an environment in which an eye-tracking process may be performed. In this example, the user 800 is using an HMD 810 that is associated with the processing unit 830, such as a games console, with the peripheral 820 allowing a user 800 to input commands to control the processing. The HMD 810 may perform eye tracking in line with an arrangement exemplified by FIG. 6a or 6b, for example—that is, the HMD 810 may comprise one or more cameras operable to capture images of either or both of the user's 800 eyes. The processing unit 830 may be operable to generate content for display at the HMD 810; although some (or all) of the content generation may be performed by processing units within the HMD 810.

The arrangement in FIG. 8 also comprises a camera 840, located outside of the HMD 810, and a display 850. In some cases, the camera 840 may be used for performing tracking of the user 800 while using the HMD 810, for example to identify body motion or a head orientation. The camera 840 and display 850 may be provided as well as or instead of the HMD 810; for example these may be used to capture images of a second user and to display images to that user while the first user 800 uses the HMD 810, or the first user 800 may be tracked and view content with these elements instead of the HMD 810. That is to say, the display 850 may be operable to display generated content provided by the processing unit 830 and the camera 840 may be operable to capture images of one or more users' eyes to enable eye-tracking to be performed.

While the connections shown in FIG. 8 are shown by lines, this should of course not be taken to mean that the connections should be wired; any suitable connection method, including wireless connections such as wireless networks or Bluetooth®, may be considered suitable. Similarly, while a dedicated processing unit 830 is shown in FIG. 8 it is also considered that the processing may in some embodiments be performed in a distributed manner—such as using a combination of two or more of the HMD 810, one or more processing units, remote servers (cloud processing), or games consoles.

The processing required to generate tracking information from captured images of the user's 800 eye or eyes may be performed locally by the HMD 810, or the captured images or results of one or more detections may be transmitted to an external device (such as a the processing unit 830) for processing. In the former case, the HMD 810 may output the results of the processing to an external device for use in an image generation process if such processing is not performed exclusively at the HMD 810. In embodiments in which the HMD 810 is not present, captured images from the camera 840 are output to the processing unit 830 for processing.

Figure 9:
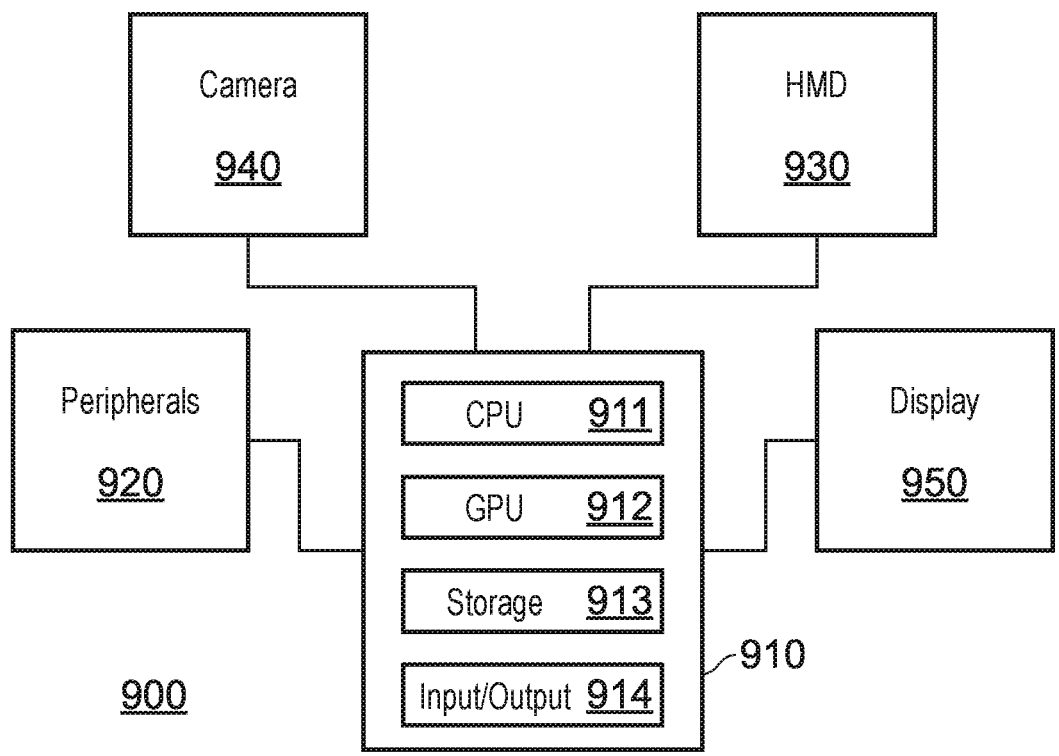
FIG. 9 schematically illustrates a gaze tracking system.

FIG. 9 schematically illustrates a system for performing one or more eye tracking processes, for example in an embodiment such as that discussed above with reference to FIG. 8. The system 900 comprises a processing device 910, one or more peripherals 920, an HMD 930, a camera 940, and a display 950. Of course, not all elements need be present within the system 900 in a number of embodiments—for instance, if the HMD 930 is present then it is considered that the camera 940 may be omitted as it is unlikely to be able to capture images of the user's eyes.

As shown in FIG. 9, the processing device 910 may comprise one or more of a central processing unit (CPU) 911, a graphics processing unit (GPU) 912, storage (such as a hard drive, or any other suitable data storage medium) 913, and an input/output 914. These units may be provided in the form of a personal computer, a games console, or any other suitable processing device.

For example, the CPU 911 may be configured to generate tracking data from one or more input images of the user's eyes from one or more cameras, or from data that is indicative of a user's eye direction. This may be data that is obtained from processing images of the user's eye at a remote device, for example. Of course, should the tracking data be generated elsewhere then such processing would not be necessary at the processing device 910.

The GPU 912 may be configured to generate content for display to the user on which the eye tracking is being performed. In some embodiments, the content itself may be modified in dependence upon the tracking data that is obtained—an example of this is the generation of content in accordance with a foveal rendering technique. Of course, such content generation processes may be performed elsewhere—for example, an HMD 930 may have an on-board GPU that is operable to generate content in dependence upon the eye tracking data.

The storage 913 may be provided so as to store any suitable information. Examples of such information include program data, content generation data, and eye tracking model data. In some cases, such information may be stored remotely such as on a server, and as such a local storage 913 may not be required—the discussion of the storage 913 should therefore be considered to refer to local (and in some cases removable storage media) or remote storage.

The input/output 914 may be configured to perform any suitable communication as appropriate for the processing device 910. Examples of such communication include the transmission of content to the HMD 930 and/or display 950, the reception of eye-tracking data and/or images from the HMD 930 and/or the camera 940, and communication with one or more remote servers (for example, via the internet).

As discussed above, the peripherals 920 may be provided to allow a user to provide inputs to the processing device 910 in order to control processing or otherwise interact with generated content. This may be in the form of button presses or the like, or alternatively via tracked motion to enable gestures to be used as inputs.

The HMD 930 may comprise a number of sub-elements, which have been omitted from FIG. 9 for the sake of clarity. Of course, the HMD 930 should comprise a display unit operable to display images to a user. In addition to this, the HMD 930 may comprise any number of suitable cameras for eye tracking (as discussed above), in addition to one or more processing units that are operable to generate content for display and/or generate eye tracking data from the captured images.

The camera 940 and display 950 may be configured in accordance with the discussion of the corresponding elements above with respect to FIG. 8.

Turning to the image capture process upon which the eye tracking is based, examples of different cameras are discussed. The first of these is a standard camera, which captures a sequence of images of the eye that may be processed to determine tracking information. The second is that of an event camera, which instead generates outputs in accordance with observed changes in brightness.

It is more common to use standard cameras in such tracking arrangements, given that they are widely available and often relatively cheap to produce. 'Standard cameras' here refer to cameras which capture images of the environment at predetermined intervals which can be combined to generate video content. For example, a typical camera of this type may capture thirty images (frames) each second, and these images may be output to a processing unit for feature detection or the like to be performed so as to enable tracking of the eye.

Such a camera comprises a light-sensitive array that is operable to record light information during an exposure time, with the exposure time being controlled by a shutter speed (the speed of which dictates the frequency of image capture). The shutter may be configured as a rolling shutter (line-by-line reading of the captured information) or a global shutter (reading the captured information of the whole frame simultaneously), for example.

However, in some arrangements it may be considered advantageous to instead use an event camera, which may also be referred to as a dynamic vision sensor. Such cameras do not require a shutter as described above, and instead each element of the light-sensitive array (often referred to as a pixel) is configured to output a signal at any time a threshold brightness change is observed. This means that images are not output in the traditional sense—however an image reconstruction algorithm may be applied that is able to generate an image from the signals output by an event camera.

While there is an increased computational complexity for generating an image from such data, the output of the event camera can be used for tracking without any image generation. One example of how this is performed is that of using an IR-sensitive event camera; when imaged using IR light, the pupil of the human eye displays a much higher level of brightness than the surrounding features. By selecting an appropriate threshold brightness, the motion of the pupil would be expected to trigger events (and corresponding outputs) at the sensor.

Independent of the type of camera that is selected, in many cases it may be advantageous to provide illumination to the eye in order to obtain a suitable image. One example of this is the provision of an IR light source that is configured to emit light in the direction of one or both of the user's eyes; an IR camera may then be provided that is able to detect reflections from the user's eye in order to generate an image. IR light may be preferable as it is invisible to the human eye, and as such does not interfere with normal viewing of content by the user, but it is not considered to be essential. In some cases, the illumination may be provided by a light source that is affixed to the imaging device, while in other embodiments it may instead be that the light source is arranged away from the imaging device.

Figure 10:
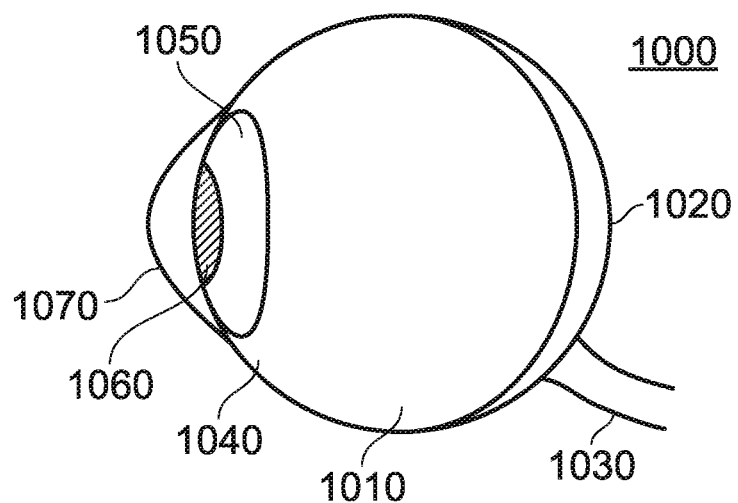
FIG. 10 schematically illustrates a human eye.

As suggested in the discussion above, the human eye does not have a uniform structure; that is, the eye is not a perfect sphere, and different parts of the eye have different characteristics (such as varying reflectance or colour). FIG. 10 shows a simplified side view of the structure of a typical eye 1000; this Figure has omitted features such as the muscles which control eye motion for the sake of clarity.

The eye 1000 is formed of a near-spherical structure filled with an aqueous solution 1010, with a retina 1020 formed on the rear surface of the eye 1000. The optic nerve 1030 is connected at the rear of the eye 1000. Images are formed on the retina 1020 by light entering the eye 1000, and corresponding signals carrying visual information are transmitted from the retina 1020 to the brain via the optic nerve 1030.

Turning to the front surface of the eye 1000, the sclera 1040 (commonly referred to as the white of the eye) surrounds the iris 1050. The iris 1050 controls the size of the pupil 1060, which is an aperture through which light enters the eye 1000. The iris 1050 and pupil 1060 are covered by the cornea 1070, which is a transparent layer which can refract light entering the eye 1000. The eye 1000 also comprises a lens (not shown) that is present behind the iris 1050 that may be controlled to adjust the focus of the light entering the eye 1000.

Figure 11:
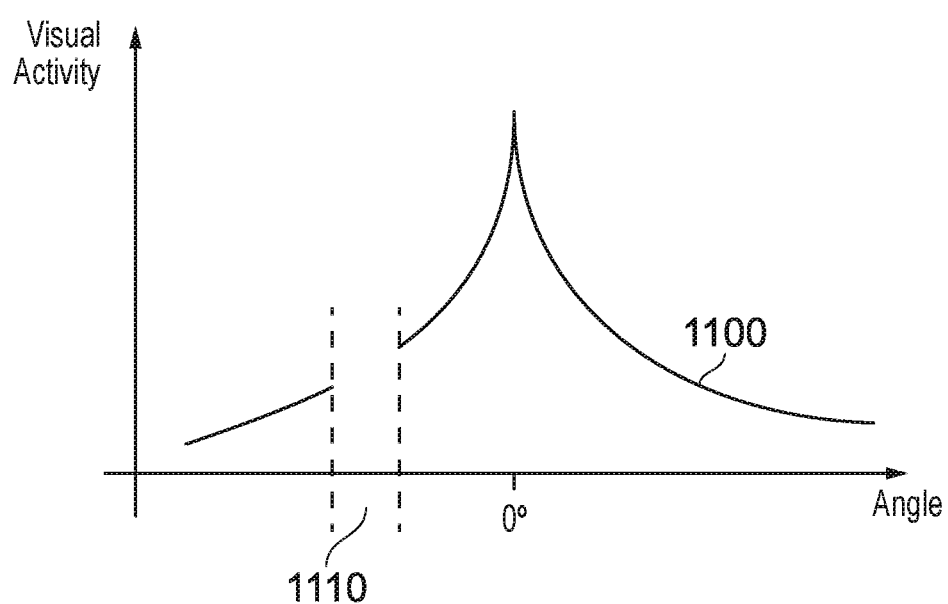
FIG. 11 schematically illustrates a graph of human visual acuity.

The structure of the eye is such that there is an area of high visual acuity (the fovea), with a sharp drop off either side of this. This is illustrated by the curve 1100 of FIG. 11, with the peak in the centre representing the foveal region. The area 1110 is the 'blind spot'; this is an area in which the eye has no visual acuity as it corresponds to the area where the optic nerve meets the retina. The periphery (that is, the viewing angles furthest from the fovea) is not particularly sensitive colour or detail, and instead is used to detect motion.

As has been discussed above, foveal rendering is a rendering technique that takes advantage of the relatively small size (around 2.5 degrees) of the fovea and the sharp fall-off in acuity outside of that.

The eye undergoes a large amount of motion during viewing, and this motion may be categorised into one of a number of categories.

Saccades, and on a smaller scale micro-saccades, are identified as fast motions in which the eyes rapidly move between different points of focus (often in a jerky fashion). This may be considered as ballistic motion, in that once the movement has been initiated it cannot be altered. Saccades are often not conscious eye motions, and instead are performed reflexively to survey an environment. Saccades may last up to two hundred milliseconds, depending on the distance rotated by the eye, but may be as short as twenty milliseconds. The speed of a saccade is also dependent upon the total rotation angle; typical speeds may be between two hundred and five hundred degrees per second.

'Smooth pursuit' refers to a slower movement type than a saccade. Smooth pursuit is generally associated with a conscious tracking of a point of focus by a viewer, and is performed so as to maintain the position of a target within (or at least substantially within) the foveal region of the viewer's vision. This enables a high-quality view of a target of interest to be maintained in spite of motion. If the target moves too fast, then smooth pursuit may instead require a number of saccades in order to keep up; this is because smooth pursuit has a lower maximum speed, in the region of thirty degrees per second.

The vestibular-ocular reflex is a further example of eye motion. The vestibular-ocular reflex is the motion of the eyes that counteracts head motion; that is, the motion of the eyes relative to the head that enables a person to remain focused on a particular point despite moving their head.

Another type of motion is that of the vergence accommodation reflex. This is the motion that causes the eyes to rotate to converge at a point, and the corresponding adjustment of the lens within the eye to cause that point to come into focus.

Further eye motions that may be observed as a part of a gaze tracking process are those of blinks or winks, in which the eyelid covers the eyes of the user. Such motions may be reflexive or intentional, and can often interfere with eye tracking as they will obscure vision of the eye, and the eye is often not stationary during such a motion.

In general, near-eye tracking solutions (such as those discussed with reference to FIGS. 6a and 6b) have particular regions in which the tracking is most accurate and/or precise in dependence upon the physical arrangement of elements of the tracking arrangement. Variations in the accuracy and/or precision may be present due to the angle of the pupil relative to the camera, the possibility of reflections, optic distortion (such as from lenses in the system), and/or the relative alignment of a camera and a light source associated with the camera for illuminating the user's eye.

Often, an arrangement is designed such that this region coincides with the position of the user's pupils when they are looking directly ahead; this is because this is considered to be a common direction for the user to be looking. Of course, this is not always the case; in some arrangements, other constraints (such as a headset shape or size) may require that the elements are arranged in a configuration in which a different region is considered to have the highest accuracy and/or position.

It is therefore considered that in some embodiments it may be considered advantageous to maintain the position of the user's pupil such that it is frequently within this region. While below this may be discussed in the context of the pupil being directed to a forward-viewing position, it should be considered that this is to be interpreted as directing the pupil to a position in which it lies within the desired region.

In embodiments of the present disclosure, it is considered advantageous to determine a confidence value based upon the position of the user's pupil. This confidence value may be used as an indication of the expected accuracy and/or precision of a gaze tracking process when the pupil is at that position. The expected accuracy and/or precision of a gaze tracking process can be considered being indicative of the tracking quality; that is, a low-quality gaze tracking is associated with low accuracy and/or precision (such as a greater-than-threshold uncertainty, or a lower-than-threshold confidence proportional to the ideal tracking conditions). FIGS. 12A and 12B schematically illustrate exemplary confidence value distributions; while these are shown as discrete values based upon position, it is considered that equivalent confidence value schemes could be implemented in which a continuous variation of the confidence value is used.

In the example of FIG. 12A, a grid 1210 is defined that overlays the captured image 1200. A confidence value of one can be assigned to the grid square 1220, indicating a maximum confidence value, while other grid squares are assigned a respective confidence value. Of course the scale that is used for the confidence values may be selected freely (for instance, a percentage confidence may be used), and the resolution of the grid may also be determined as appropriate for a given implementation.

For example, in the context of FIG. 12A the centre grid square 1220 may have a confidence value of one, the surrounding eight grid squares a confidence value of one-half, the surrounding sixteen grid squares a confidence value of one-quarter, and the remaining grid squares a confidence value of zero. These different groups of grid squares are indicated by the varying hatching applied in FIG. 12A.

Of course, rather than defining groups of grid squares with the same confidence value it is also possible that each grid square is assigned a confidence value on an individual basis. While this may still result in grid squares with identical confidence values, such an approach may still provide improved flexibility. It is also considered that a symmetric grouping as indicated in FIG. 12A is purely exemplary, rather than being a requirement; in some cases (for example, those in which the camera is offset from the user's eye rather than being directly in front) the confidence value may vary from the maximum by a different amount in different directions. For instance, a camera that is located towards the edges of the user's face (rather than towards the nose) may experience a sharper fall in confidence value in regions nearer the nose than regions nearer the edge of the face.

FIG. 12B schematically illustrates an alternative distribution of confidence values that may be more appropriate in some embodiments. In this Figure, a circular region 1230 of maximum confidence is defined with annuli having successively lower confidence values defined about this region 1230.

As noted above, any distribution (discrete or continuous) may be used to represent the confidence values for different regions of captured images.

It should also be noted that in some embodiments other factors may be considered when determining the confidence value. For example, external lighting may vary the confidence value at different positions due to the introduction of reflections and/or shadows. It is therefore considered that the confidence value may be dependent upon one or more variables including image position, lighting, and/or any other suitable variables. An appropriate determination of a confidence value may be determined using any suitable method, including a calibration process or a derivation based upon parameters of the gaze tracking device.

In some embodiments, particularly those in which non-symmetric arrangement of gaze tracking elements are used, the confidence value associated with each eye may be different. This may also be the case when a user has asymmetric eye function (such as a so-called 'lazy eye'). In such cases, any suitable approach may be taken to determine a single confidence value; an average of the values may be used, or a particular eye may be selected as the principal eye and only confidence values for this eye are used. The appropriate utilisation of the differing confidence values may vary from user to user, and as such this can be determined based on the specific implementation details, or user preference, for example.

Once determined, the confidence value may be used to characterise the gaze detection process; that is to say that any determination of the user's gaze direction can be assigned a confidence value based upon the determined direction (as this is indicative of the pupil position within the captured images).

By applying a confidence value to the gaze tracking result, it is possible to vary the processing that is performed by a processing device associated with the gaze tracking system in a beneficial manner. For instance, in embodiments of the present disclosure it is considered that an improved determination of a loss of gaze tracking can be established.

In some embodiments a threshold is determined for the confidence value, such that if the confidence value falls below this threshold then it is deemed that there is a loss of tracking. This differs from traditional arrangements, in that it is only deemed that a loss of tracking occurs when no gaze tracking result is able to be generated. Embodiments of the present disclosure therefore provide a greater continuity in the user experience, as processing can be performed before a break in the gaze tracking occurs.

The threshold value may be selected freely by the skilled person, as appropriate for a particular implementation. For example, in some use cases a higher threshold may be considered more appropriate (such as those in which a loss of gaze tracking would have a more significant impact on the user experience). An example is that of an embodiment in which foveal rendering is performed; in such cases, loss of gaze tracking can result in the high-resolution area of the display being in the wrong place which can be very noticeable to the user. A threshold value may be defined as any suitable value; for example, five percent, twenty percent, forty percent, and fifty percent of the maximum confidence value may be suitable threshold values (although of course any suitable integer or non-integer value may be selected).

In response to a lower-than-threshold confidence value for a gaze tracking result, processing may be performed that is intended to influence the gaze direction of the user so as to return one or both of their pupils to regions in which the confidence value is higher. In some embodiments, this comprises a modification of image content that is being displayed to a viewer via a head-mountable (or other) display device.

A first example of such processing is that of generating a UI element that attracts the user's attention or otherwise makes them aware of the gaze detection having a low confidence value. This may be located in the centre of the display (or whichever location has the highest confidence value), or in the last location that the viewer gazed towards in which the gaze detection had a suitably high level of confidence. Of course, multiple UI elements and/or moving UI elements may be utilised as appropriate for redirecting the user's gaze to a suitable location.

An alternative, or additional, example in line with this is the generation of a directional UI element (such as an arrow) which explicitly instructs a user as to how to modify their gaze. Alternative formats for the UI element include an effect applied to the edge of a screen that is considered to be an instruction for the user to move their gaze in that direction, or the display of a text-based instruction (such as 'LOOK LEFT').

FIG. 13 schematically illustrates a selection of such UI elements in a display area 1300. The UI element 1310 is an example of a UI element that attracts the user's gaze to the centre of the display area 1300 (where it is considered that the confidence value is the highest). The arrow 1320 is an example of a UI element that specifically instructs the user to redirect their gaze in a particular direction; this is presented at a predetermined position (the top of the display) so as to be consistently displayed. An alternative (or additional) arrow 1340 is shown within the user's point of focus 1330, as an example of a more dynamic display of UI elements. Of course, the respective size of the elements and the defined point of focus 1330 may be varied as appropriate, as can the positioning; this example is provided so as to indicate that the UI element may be displayed closer to the user's focal region to ensure that it can be easily seen.

An additional example of such processing is that of applying a vignette effect or the like to the edges of the screen; this would be expected to make viewing the centre of the screen more appealing, thereby redirecting the user's gaze in this direction. This effect may comprise a blurring of the image content in these regions, and/or a reduction in the colour levels; any other suitable effects may also be considered useful in such embodiments. Such effects may be applied with a varying impact dependent upon the confidence value—that is, the blurring or colour reduction may increase as the confidence value decreases. The varying impact may be determined in a stepwise fashion or a continuous manner as appropriate; in either case, the variance should be considered to be proportional to the confidence value.

FIG. 14 schematically illustrates an example of an embodiment in which a visual effect is applied to the peripheral regions of the displayed image. In particular, the image 1400 comprises a central region 1410 in which an unaltered image is displayed, and a peripheral region 1420 in which a visual effect is applied. As discussed above, this visual effect can take any suitable form; the intended purpose of the effect is to redirect the user's gaze and so any effect that assists with this purpose this may be considered suitable.

In some embodiments, rather than the area 1420 extending around the entirety of the periphery of the image 1400 the processing may instead apply an effect to a portion of the periphery. For example, if the user's gaze is directed towards the right hand side of an image (and it is desired to return the gaze to a more central area) then it may be more appropriate or efficient to apply the effect to the right hand side of the image. Of course, any suitable portion may be selected for the visual effect to be applied as appropriate for a given embodiment.

It should be understood that any other image processing may be performed on one or more images provided to the user, rather than being limited only to these examples. It is considered that any image processing techniques may be considered appropriate if it may be suitable for redirecting the user's gaze.

Audio prompts may also be considered appropriate in some embodiments, such as a voice instruction to a user that requests that they redirect their gaze. Of course, this may be inappropriate in some implementations as this may reduce the sense of immersion experienced by a user; it is therefore considered that any suitable audio may be used to instruct a user to change their gaze or to otherwise encourage it (such as by providing a noise that would be expected to pique the user's interest with a particular apparent direction relative to the user).

In addition to the processing described above, it is also considered that one or more other processes may be adapted in dependence upon the confidence value. For instance, the size of a foveal region may be selected so as to be proportional to the confidence value such that a smaller foveal region is used when the confidence value is higher. In some cases, the foveal rendering may be abandoned altogether (at least on a temporary basis) when the confidence value falls below the threshold value.

In some embodiments, it is considered that it may be advantageous to enable the generating of outputs (including the audio and video prompts described above) in dependence upon predicted pupil motion instead of (or in addition to) detected pupil location or motion information. This may enable low-quality tracking (or at least the risk of low-quality tracking) to be identified pre-emptively; this may enable a softer approach to the guiding of the user's gaze, and/or the avoidance of low-quality tracking altogether.

An example of a beneficial use case is that of identifying a pattern of pupil motion that is likely to result in the pupil moving to a position in which the tracking effectiveness is reduced based upon previously observed user eye motion patterns. This therefore allows both current and previous pupil position data to be compared to previous pattern information to determine correlations. In such a case, once an initial portion of the pattern has been identified, processing may be performed to redirect the user's gaze or to interrupt the pattern—this may be achieved by using any of the above methods. In addition to, or instead of, the above methods, one or more adaptations may be made to the content that is being viewed by a user. For instance, the spawn location of enemies in a game may be modified to assist in redirecting the user's gaze or interrupting the pattern.

Analysis of the content that is being viewed by the user may also be used in formulating predictions. For instance, identifying that an object is likely to attract a user's attention can be considered to be useful in predicting that a user's attention (and gaze) will be directed towards that object.

In some cases, it is also considered that one or more characteristics of an eye motion may be indicative of the intended motion. For instance, different types of eye motion (as discussed above) have different acceleration profiles and maximum speeds—by determining these characteristics, it may be possible to predict a duration or magnitude of eye motion, and pre-empt a loss of tracking in this manner. This is an example of a current pupil velocity (and/or previous pupil velocity) being used to predict pupil motion.

By performing such analysis, it is considered that content may be tailored for users so as to reduce the risk of loss of gaze tracking. This may be similar to the modification of content as described above, but performed prior to user operation (or as part of a calibration process or the like) rather than on-the-fly to correct the user's eye motion (that is, to cause it to move to an area with improved tracking accuracy/precision).

Figure 15:
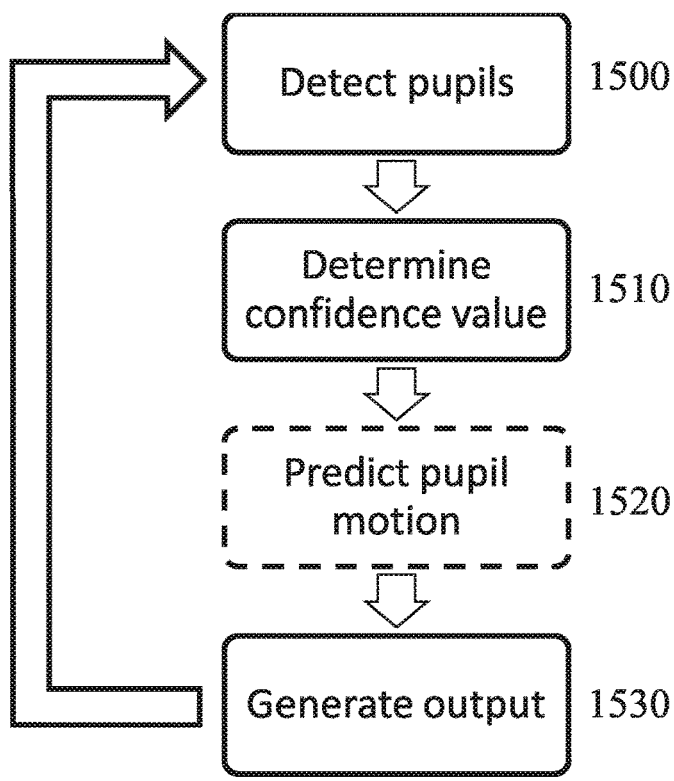
FIG. 15 schematically illustrates a gaze tracking method.

FIG. 15 schematically illustrates a gaze tracking method in line with embodiments discussed in the above description.

A step 1500 comprises detecting the location of a pupil in one or more images captured of one or both a user's eyes. This may be performed with one or more cameras, which may be located on a head-mounted unit that is worn by a user.

A step 1510 comprises determining a confidence value in dependence upon the identified pupil position, the confidence value indicating an expected reliability of the detection of the pupil location. This may be based upon a predetermined mapping of position to accuracy/precision (such as in the form of a lookup table), or may be calculated dynamically based upon the uncertainty identified in a particular measurement. Any other suitable method for determining confidence in a detected measurement may be applied instead of, or in addition to, these examples.

An optional step 1520 comprises predicting future motion of one or both of the user's pupils and to determine confidence values corresponding to the positions corresponding to the predicted motion. As noted above, this may comprise the identification of eye motion patterns performed by a user and a determination of which of these lead to the pupil moving to an area with low quality tracking.

A step 1530 comprises generating, in dependence upon the determined confidence value, one or more outputs to cause the user to modify their pupil location to a location with a higher determined confidence value. If the prediction step is performed, the step 1530 may comprise generating the one or more outputs in dependence upon the predicted motion in addition to, or instead of, the detected pupil location. Of course, should the confidence value be high enough the step 1530 may comprise generating no output.

Once completed, processing returns to step 1500, as part of a continuous tracking process. Of course, the number of steps and their ordering may be varied as appropriate. For instance, the prediction process may be performed largely prior to the tracking (such as based upon pre-existing information about a user, including calibration data or eye motion history) and the generation of outputs can be performed at least partially prior to the pupil detection process. In a further example, the detection of pupil position may be performed at a high frequency (such as two hundred hertz) while the determination of a confidence value may be performed at a lower frequency (such as one hundred hertz) based upon averaged or alternate position detections.

Figure 16:
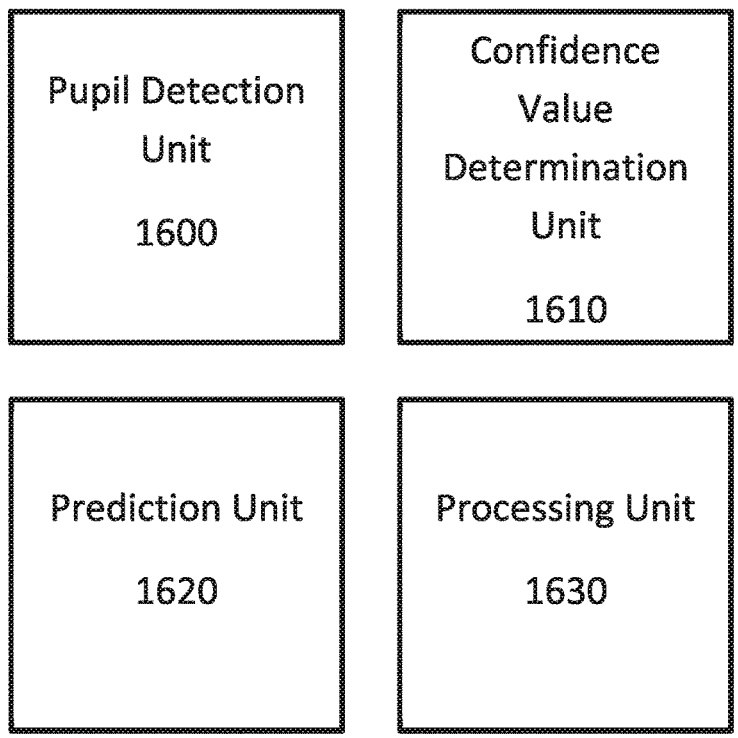
FIG. 16 schematically illustrates a gaze tracking system.

FIG. 16 schematically illustrates a gaze tracking system comprising a pupil detection unit 1600, a confidence value determination unit 1610, an optional prediction unit 1620, and a processing unit 1630. In some embodiments, this system is provided in conjunction with a head-mountable display unit operable to display one or more images to the user and to provide one or more outputs to the user. The units described here may be configured in any appropriate arrangement, and may be embodied in any combination of devices as appropriate for a given implementation.

The pupil detection unit 1600 is operable to detect the location of a pupil in one or more images captured of one or both a user's eyes. The images may be captured by one or more cameras directed towards the user's eye or eyes; in some cases, these may be provided as a part of a head-mountable unit.

The confidence value determination unit 1610 is operable to determine a confidence value in dependence upon the identified pupil position, the confidence value indicating an expected reliability of the detection of the pupil location. The expected reliability may be calculated in dependence upon one or more of pupil distance from a camera used to capture images of the eye, the relative angle of the pupil to the camera, and the amount and/or angle of light incident on the eye. This may be calculated on-the-fly as a user interacts with a display, or in advance given one or more parameters about the operation of the system by the user.

The optional pupil motion prediction unit 1620 is operable to predict future motion of one or both of the user's pupils and to determine confidence values corresponding to the positions corresponding to the predicted motion. The predictions may be based upon one or more of a current pupil position, current pupil velocity, past pupil motion, and information about content being viewed by the user.

The processing unit 1630 is operable to generate, in dependence upon the determined confidence value, one or more outputs to cause the user to modify their pupil location to a location with a higher determined confidence value. In embodiments in which the pupil motion prediction unit 1620 is used, the processing unit 1630 is operable to generate the one or more outputs in dependence upon the predicted motion in addition to, or instead of, the detected pupil location.

In some embodiments, the processing unit 1630 is operable to generate an audio output to modify their pupil direction; this may comprise any suitable sound that causes a user to change their gaze direction. Examples include spoken directions and noises to attract attention towards (or away from) a specific location.

Alternatively, or in addition, the processing unit 1630 may be operable to generate a visual output to cause the user to modify their pupil location. In some examples, the visual output comprises a user interface element. The visual output may instead (or additionally) comprise an optical effect that is applied to one or more peripheral regions of an image for display to the user, and/or a virtual object within content being viewed by the user. Examples of such visual elements are discussed above with reference to FIGS. 13 and 14.

In some embodiments, one or more aspects of the one or more generated outputs may be varied proportionally to the determined confidence value. For example, the volume of an audio output may be increased or the size of a visual element may be increased as the confidence value decreases. Any suitable change to the generated outputs may be provided, with the intention of providing a less intrusive output at high confidence values and more impactful output at lower confidence values (or when a lower confidence value is predicted). While the definitions of high and low confidence values may be selected freely as appropriate for a given implementation, an example is the use of a threshold in which a confidence value equal to or above 0.7 is considered high confidence, and below this is considered low confidence. Of course, a more graduated or a continuous scale may be used rather than a simple binary threshold determination.

The arrangement of FIG. 16 is an example of a processor (for example, a GPU and/or CPU located in a games console or any other computing device) that is operable to implement processing in dependence upon gaze tracking, and in particular is operable to:

detect the location of a pupil in one or more images captured of one or both a user's eyes;

determine a confidence value in dependence upon the identified pupil position, the confidence value indicating an expected reliability of the detection of the pupil location; and generate, in dependence upon the determined confidence value, one or more outputs to cause the user to modify their pupil location to a location with a higher determined confidence value.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Embodiments of the claims may be implemented in accordance with one or more of the following numbered clauses:

1. A gaze tracking system comprising:
    a pupil detection unit operable to detect the location of a pupil in one or more images captured of one or both a user's eyes;
    a confidence value determination unit operable to determine a confidence value in dependence upon the identified pupil position, the confidence value indicating an expected reliability of the detection of the pupil location; and
    a processing unit operable to generate, in dependence upon the determined confidence value, one or more outputs to cause the user to modify their pupil location to a location with a higher determined confidence value.

2. A system according to clause 1, wherein the processing unit is operable to generate an audio output.

3. A system according to any preceding clause, wherein the processing unit is operable to generate a visual output.

4. A system according to clause 3, wherein the visual output comprises a user interface element.

5. A system according to clause 3, wherein the visual output comprises an optical effect that is applied to one or more peripheral regions of an image for display to the user.

6. A system according to clause 3, wherein the visual output comprises a virtual object within content being viewed by the user.

7. A system according to any preceding clause, comprising a pupil motion prediction unit operable to predict future motion of one or both of the user's pupils and to determine confidence values corresponding to the positions corresponding to the predicted motion,
wherein the processing unit is operable to generate the one or more outputs in dependence upon the predicted motion in addition to, or instead of, the detected pupil location.

8. A system according to clause 7, wherein the predictions are based upon one or more of a current pupil position, current pupil velocity, past pupil motion, and information about content being viewed by the user.

9. A system according to any preceding clause, wherein one or more aspects of the one or more generated outputs is varied proportionally to the determined confidence value.

10. A system according to any preceding clause, wherein the expected reliability is calculated in dependence upon one or more of pupil distance from a camera used to capture images of the eye, the relative angle of the pupil to the camera, and the amount and/or angle of light incident on the eye.

11. A system according to any preceding clause, comprising a head-mountable display unit operable to display one or more images to the user and to provide the one or more outputs to the user.

12. A system according to any preceding clause, comprising one or more cameras operable to capture images of one or both of the user's eyes.

13. A gaze tracking method comprising:
detecting the location of a pupil in one or more images captured of one or both a user's eyes;
determining a confidence value in dependence upon the identified pupil position, the confidence value indicating an expected reliability of the detection of the pupil location; and
generating, in dependence upon the determined confidence value, one or more outputs to cause the user to modify their pupil location to a location with a higher determined confidence value.

14. Computer software which, when executed by a computer, causes the computer to carry out the method of clause 13.

15. A non-transitory machine-readable storage medium which stores computer software according to clause 14.

The invention claimed is:

1. A gaze tracking system comprising:
a pupil detector operable to produce a detected pupil location of a pupil of a user by analyzing an actual pupil location of the user in one or more images captured of one or both of the user's eyes;
a confidence value determinator operable to determine a confidence value indicative of an accuracy and precision of the detected pupil location with respect to the actual pupil location and therefore an expected reliability of the detected pupil location; and
a processor operable to generate, in dependence upon the determined confidence value, one or more outputs to cause the user to modify the actual pupil location to a new actual pupil location that results in a higher determined confidence value.

2. The system of claim 1, wherein the processor is operable to generate an audio output.

3. The system of claim 1, wherein the processor is operable to generate a visual output.

4. The system of claim 3, wherein the visual output comprises a user interface element.

5. The system of claim 3, wherein the visual output comprises an optical effect that is applied to one or more peripheral regions of an image for display to the user.

6. The system of claim 3, wherein the visual output comprises a virtual object within content being viewed by the user.

7. The system of claim 1, wherein one or more aspects of the one or more generated outputs is varied proportionally to the determined confidence value.

8. The system of claim 1, wherein the expected reliability is calculated in dependence upon one or more of a pupil distance from a camera used to capture the one or more images of the one or both of the user's eyes, a relative angle of the pupil to the camera, and an amount and/or an angle of light incident on the one or both of the user's eyes.

9. The system of claim 1, further comprising a head-mountable display operable to display one or more images to the user and to provide the one or more outputs to the user.

10. The system of claim 1, further comprising one or more cameras operable to capture the one or more images of the one or both of the user's eyes.

11. The system of claim 1, further comprising:
a pupil motion predictor operable to predict future motion of one or both of the user's pupils and to determine confidence values corresponding to future actual pupil locations corresponding to the predicted future motion,
wherein the processor is operable to further generate the one or more outputs in dependence upon the predicted future motion in addition to, or instead of, the detected pupil location.

12. The system of claim 11, wherein the prediction is based upon one or more of a current actual pupil location, a current pupil velocity, a past pupil motion, and information about content being viewed by the user.

13. A gaze tracking method comprising:
producing a detected pupil location of a pupil of a user by analyzing an actual pupil location of the user in one or more images captured of one or both of the user's eyes;
determining a confidence value indicative of an accuracy and precision of the detected pupil location with respect to the actual pupil location and therefore, an expected reliability of the detected pupil location; and
generating, in dependence upon the determined confidence value, one or more outputs to cause the user to modify the actual pupil location to a new actual pupil location that results in a higher determined confidence value.

14. The method of claim 13, further comprising:
predicting future motion of one or both of the user's pupils and to determine confidence values corresponding to future actual pupil locations corresponding to the predicted future motion,
wherein the generating includes generating the one or more outputs in dependence upon the predicted future motion in addition to, or instead of, the detected pupil location.

15. A non-transitory machine-readable storage medium which stores computer software which, when executed by a computer, causes the computer to perform a gaze tracking method comprising:
- producing a detected pupil location of a pupil of a user by analyzing an actual pupil location of the user in one or more images captured of one or both of the user's eyes;
- determining a confidence value indicative of an accuracy and precision of the detected pupil location with respect to the actual pupil location and therefore, an expected reliability of the detected pupil location; and
- generating, in dependence upon the determined confidence value, one or more outputs to cause the user to modify the actual pupil location to a new actual pupil location that results in a higher determined confidence value.

16. The non-transitory machine-readable storage medium of claim 15, wherein the method further comprises:
- predicting future motion of one or both of the user's pupils and to determine confidence values corresponding to future actual pupil locations corresponding to the predicted future motion,
- wherein the generating includes generating the one or more outputs in dependence upon the predicted future motion in addition to, or instead of, the detected pupil location.

* * * * *